United States Patent [19]

Agrawal et al.

[11] Patent Number: 4,930,072
[45] Date of Patent: May 29, 1990

[54] METHOD FOR COMPUTING TRANSITIVE CLOSURE

[75] Inventors: Rakesh Agrawal, Chatham; Hosagrahar V. Jagadish, Berkeley Heights, both of N.J.

[73] Assignee: AT&T Bell Laboratories, Murray Hill, N.J.

[21] Appl. No.: 91,236

[22] Filed: Aug. 31, 1987

[51] Int. Cl.$^5$ .................. G06F 15/40; G06F 15/31
[52] U.S. Cl. ...................... 364/300; 364/200; 364/282.1; 364/282.2
[58] Field of Search ... 364/200 MS File, 900 MS File, 364/300

[56] References Cited

U.S. PATENT DOCUMENTS

| | | | |
|---|---|---|---|
| 4,267,568 | 5/1981 | Dechant et al. | 364/200 |
| 4,422,158 | 12/1983 | Galie | 364/900 |
| 4,468,732 | 8/1984 | Raver | 364/200 |
| 4,479,196 | 10/1984 | Ferrer et al. | 364/900 |
| 4,484,297 | 11/1984 | Maier et al. | 364/900 |
| 4,497,039 | 1/1985 | Kitakami et al. | 364/200 |
| 4,611,298 | 9/1986 | Schuldt | 364/900 |
| 4,627,019 | 12/1986 | Ng | 364/900 |
| 4,745,559 | 5/1988 | Willis et al. | 364/514 |
| 4,797,810 | 1/1989 | McEntee et al. | 364/200 |
| 4,803,642 | 2/1988 | Muranaga | 364/513 |
| 4,809,158 | 2/1989 | McCauley | 364/200 |
| 4,814,971 | 3/1989 | Thatte | 364/200 |
| 4,853,842 | 8/1989 | Thatte et al. | 364/200 |

OTHER PUBLICATIONS

Alpha: An Extension of Relational Algebra to Express a Class of Recursive Queries, R. Agrawal, Proc. 3rd Intl. Conf. on Data Engineering, Los Angeles, Calif., 2/87.
Traversal Recursion: A Practical Approach to Supporting Recursive Applications, A. Rosenthal, Proc. ACM-SIGMOD 1986 Intl. Conf. on Management of Data, Washington, D.C., 5/86.
Heuristic Search in Data Base Systems, R. Kung et al., Proc. 1st Intl. Workshop Expert Database Systems, Kiawah Island, S.C., Oct. 1984.
Naive Evaluation of Recursively Defined Relations, A. F. Bancillion, Tech. Rept. DB-004-85, MCC, Austin, Tex.
Evaluation of Recursive Queries Using Joint Indices, P. Valduriez et al., Proc. 1st Intl. Conf. Expert Database Systems, Charleston, S.C. 4/86.
On the Computation of the Transitive Closure of Relational Operators, Y. E. Ioannidis, Proc. 12th Intl. Conf. Very Large Data Bases, Kyota, Japan, 8/86.
On the Evaluation of Recursion in Deductive Database Systems by Efficient Differential Fixpoint Iteration, U. Guntzer et al., Proc. IEEE 3rd Intl. Conf. Data Engineering, Los Angeles, Calif. 2/87.
New Strategies for Computing the Transitive Closure of a Database Relation, H. Lu, Proc. 13th Intl. Conf. Very Large Data Bases, Brighton, England 9/87.
A Theorem on Boolean Matrices, S. Warshall, Journal of ACM, vol. 9, No. 1, 1/62.
A Modification of Warshall's Algorithm for the Transitive Closure of Binary Relations, H. S. Warren, Communications of ACM, vol. 18, No. 4, 4/75.
An Algorithm for Transitive Closure with Linear Expected Time, C. P. Schnorr, SIAM Journal of Computing, vol. 7, No. 2, 5/78.

Primary Examiner—Gareth D. Shaw
Assistant Examiner—Kevin A. Kriess
Attorney, Agent, or Firm—Henry T. Brendzel

[57] ABSTRACT

A method and apparatus for creating a transitive closure of a database when the database is stored on a secondary storage in the form of links connecting nodes. The method consists of partitioning the database, transferring one partition at a time from the secondary storage to the main memory, and processing a partition in such a way that accesses to the portions of the database not in main memory are minimized. As much of the unprocessed database as would fit a predetermined fraction of main memory is fetched as one partition, and if, during the processing of this partition, the main memory becomes full, the size of the partition is reduced dynamically by discarding a portion of the database in the current partition, and including this portion in the next partition. The processing of a partition involves, for each node in the partition, the operation of creating a direct connection between every pair of nodes that are indirectly connected through this node.

22 Claims, 7 Drawing Sheets

FIG. 1

| Component Part | | Manufactured Part | | Number |
|---|---|---|---|---|
| Number | Name | Number | Name | Used |
| XXXVZY | 20pF capacitor | YZW104 | controller board | 8 |
| XXXVZY | 20pF capacitor | ZXF235 | graphics board | 22 |
| 3245ZJ | workstation | 100000 | office information system | 4 |
| 74L362 | 16-bit microprocessor | YZW104 | controller board | 1 |
| YZW104 | controller board | 3245ZJ | workstation | 1 |
| KJH895 | display unit | 3245ZJ | workstation | 1 |
| ZXF235 | graphics board | KJH895 | display unit | 1 |

FIGURE 4

| | | | | |
|---|---|---|---|---|
| XXXVZY | 20pF capacitor | YZW104 | controller board | 8 |
| XXXVZY | 20pF capacitor | ZXF235 | graphics board | 22 |
| XXXVZY | 20pF capacitor | KJH895 | display unit | 22 |
| XXXVZY | 20pF capacitor | 3245ZJ | workstation | 30 |
| XXXVZY | 20pF capacitor | 100000 | office information system | 120 |
| 74L362 | 16-bit microprocessor | YZW104 | controller board | 1 |
| 74L362 | 16-bit microprocessor | 3245ZJ | workstation | 1 |
| 74L362 | 16-bit microprocessor | 100000 | office information system | 4 |
| YZW104 | controller board | 3245ZJ | workstation | 1 |
| YZW104 | controller board | 100000 | office information system | 4 |
| ZXF235 | graphics board | KJH895 | display unit | 1 |
| ZXF235 | graphics board | 3245ZJ | workstation | 1 |
| ZXF235 | graphics board | 100000 | office information system | 4 |
| KJH895 | display unit | 3245ZJ | workstation | 1 |
| KJH895 | display unit | 100000 | office information system | 4 |
| 3245ZJ | workstation | 100000 | office information system | 4 |

METHOD FOR COMPUTING TRANSITIVE CLOSURE

BACKGROUND OF THE INVENTION

This invention relates to database management systems and methods and, more particularly, to intelligent database systems and methods that can deduce new information from available data.

Database management systems have been traditionally used in data processing applications such as payroll processing, financial accounting, and transaction processing. Now, database management systems are being increasingly put to use in new applications such as in expert database systems, and in response thereto new database management systems and machines are being designed.

Commonly, relational databases comprise a large number of entries and each entry is composed of a number of fields. The entries are sometimes referred to as records or tuples. Each tuple in a database generally consists of the same fields arranged in the same order, with the difference between the tuples being in the values of the fields. Information is retrieved from such databases through a relatively limited number of basic, or primitive, operations which may be combined to form very powerful queries.

One such primitive operation, for example, is "select" on a value of a prechosen field. This operation ignores all fields other than the selected field, searches in the selected field (through the tuples) for values that meet the specified condition, and retrieves the tuples that meet the search criterion (or a chosen portion thereof).

Another primitive operation is "union", where two databases which are defined over the same fields are concatenated to form a larger database. When the catenation is effected, some tuples may appear more than once, so part of the "union" operation deletes the redundant tuples. A "difference" primitive operation also considers two separate databases, but the result of the difference operation is a database that contains only the tuples that appear in the first database but no in the second database.

Still another primitive operation is known as the "join" operation. It permits a joinder of those portions of two databases that meet a chosen criterion. For example, when a join is specified on a particular field in each of two databases under consideration, those tuples in the two databases that match (in value) in the two chosen fields are concatenated to form new tuples which form a new database. Naturally, the two chosen fields should have values over a common range; otherwise no matches would be found.

A careful consideration of the above primitive operations reveals that much information can be gained by judiciously querying databases to extract the information that was explicitly inserted therein. But, databases also possess a lot of information that has not been directly, or explicitly, inserted. That information can also be extracted with the known primitive operations, but not very efficiently. For example, given a database with three fields where two of them represent cities that have a direct freeway linking them, and a third field giving the distance between the two cities along this freeway, one may wish to find a route to get from one city to another that is not directly linked to it by a freeway. Given only the conventional primitives, such a query can be answered only through a program that contains a large number of the primitive operations. If, however, a primitive operation were available that was capable of efficiently manipulating the database so that the query could be answered directly, many heretofore difficult tasks could be easily accomplished. The capability needed for the above example is generally referred to as "transitive closure". It is an often needed capability.

Many artisans have recognized the need to extend the set of primitive operations on databases, and some have suggested primitives that, in essence, are the transitive closure operation. Examples of these proposals are the "alpha" operator proposed by R. Agrawal in "Alpha: An Extension of Relational Algebra to Express a Class of Recursive Queries", *Proc. 3rd Int'l Conf. on Data Engineering*, Los Angeles, California, Feb. 1987; the "traversal recursion" operator proposed by A. Rosenthal et al. in "Traversal Recursion: A Practical Approach to Supporting Recursive Applications", *Proc. ACM-SIGMOD 1986 Int'l Conf. on Management of Data*, Washington D.C., May 1986; and the "*" operator proposed by R. Kung et al. in "Heuristic Search in Data Base Systems", *Proc. 1st Int'l Workshop Expert Database Systems*, Kiawah Island, South Carolina, Oct. 1984.

Before describing the methods and techniques heretofore employed in the art to achieve the transitive closure operation, it may be useful to present a pictorial representation of transitive closure.

As stated above, a database relation consists of a set of tuples, each of which consists of a number of fields. The values in each field are defined over a certain range. A compound field in a database consists of two or more fields considered together. Often, two fields (or two compound fields) in a database relation will be defined over the same range. When each value present in such two fields is represented by a node, and each tuple is represented as a directed link (or an arrow) that connects the two values found in the fields of the tuple, then the resulting graph (collection of nodes and connecting links) represents the database. The additional fields associated with each tuple in the database relation can be used to label the links in the graph. As an aside, the reason for using directed rather than undirected links is to distinguish between the two fields participating in the relation that were used to define the graph.

Turning attention to the graph itself, a "path" in such a graph consists of a set of consecutive links that can be followed to reach a selected destination node of the graph from a chosen source node of the graph. By our definition, the "transitive closure" of a graph is a new graph with a link between every pair of nodes between which there exists a path. Labels existing on the links of the original graph are transformed in accordance with a chosen function to form new labels for the links created by the transitive closure. Sometimes, even if a link already exists between a pair of nodes, the discovery of a different path could cause the label on such a link to be transformed according to some prescribed function. The transitive closure of a database relation is the database relation corresponding to the transitive closure of the graph of the original database relation given.

Much of the success of the past database systems can be attributed to the discovery of efficient methods for implementing various primitive operators for databases. Following the same lead, designers have attempted to design methods for computing transitive closure of a database relation. Most of these methods can be classified as iterative methods.

The semi-naive method, described by A. F. Bancilhon in "Naive Evaluation of Recursively Defined Relations", *Tech. Rept. DB-004-85*, MCC, Austin, Texas, starts with paths of length one and in each iteration finds paths that are one longer. The logarithmic method is described by P. Valduriez et al. in "Evaluation of Recursive Queries Using Join Indices", *Proc. 1st Int'l Conf. Expert Database Systems*, Charleston, South Carolina, April 1986, and by Y. E. Ioannidis in "On the Computation of the Transitive Closure of Relational Operators", *Proc. 12th Int'l Conf. Very Large Data Bases*, Kyoto, Japan, Aug. 1986. This method computes in each iteration all paths of lenght up to twice the lenght of paths already known. Variations on the above methods have been described by Y. E. Ioannidis in "On the Computation of the Transitive Closure of Relational Operators", *Proc. 12th Int'l Conf. Very Large Data Bases*, Kyoto, Japan, Aug. 1986, U. Guntzer et al. in "On the Evaluation of Recursion in Deductive Database Systems by Efficient Differential Fixpoint Iteration", *Proc. IEEE 3rd Int'l Conf. Data Engineering*, Los Angeles, California, Feb. 1987, and H. Lu "New Strategies for Computing the Transitive Closure of a Database Relation", *Proc. 13th Int'l Conf. Very Large Data Bases*, Brighton, England, Sept. 1987.

There are two major problems with the above prior art methods. First, the termination of the iterative methods depends on the longest path in the graph, and if the graph has long paths, many iterations are required before the results is obtained. Second, the iterative methods end up creating an enormous number of duplicates (because, when a path between a pair of nodes is discovered, it is not easy to verify whether a path between this pair of nodes already exists), particularly if the graph contains cycles, and incurs a heavy performance penalty in removing them.

Methods have also been devised for computing transitive closure of boolean matrices (that is, matrices with only 1 or 0 as their elements). Some well known methods of this type are the method described by S. Warshall in "A Theorem on Boolean Matrices", *Journal of ACM*, Vol. 9, No. 1, Jan. 1962, by H. S. Warren in "A Modification of Warshall's Algorithm for the Transitive Closure of Binary Relations", *Communications of ACM*, Vol. 18, No. 4, April 1975, and by C. P. Schnorr in "An Algorithm for Transitive Closure with Linear Expected Time", *SIAM Journal of Computing*, Vol. 7, No. 2, May 1978.

In accordance with the Warshall algorithm, given an initial v by v Boolean matrix of elements $a_{ij}$ over a v node graph, with $a_{ij}$ being 1 if there is an arc from node i to node j and 0 otherwise, one can obtain the transitive closure of the given boolean matrix as:

```
For k = 1 to v
For i = 1 to v
For j = 1 to v
a_ij = a_ij ∪ (a_ik ∩ a_kj)
```

In graph terms, one can understand the algorithm as follows:

```
For every node k
For every predecessor i of k
For every successor j of k
```
-continued
```
Make j a successor of i, and make i a predecessor of j.
```

If the graph is represented as a relation with each tuple representing an arc, one has to maintain the relation sorted two ways, to obtain the effect of having both predecessor and successor lists. The implementation of the Warshall algorithm then involves, for each node, fetching its successor and predecessor lists, and then for each successor (predecessor) fetching its predecessor (successor) list for possible update. It is also possible to keep only one list, say a successor list, and scan through all the lists each time to determine the predecessor of a node.

Warren noted that the Warshall algorithm involved fetching random bits from the Boolean matrix, and proposed a modification that would permit direct operation upon Boolean vectors without the overhead of bit extraction; but in two passes:

```
For i = 1 to v
For k = 1 to i-1
For j = 1 to v
a_ij = a_ij ∪ (a_ik ∩ a_kj)
For i = 1 to v
For k = i + 1 to v
For j = 1 to v
a_ij = a_ij ∪ (a_ik ∩ a_kj)
```

The only change in the Warren algorithm is that the i and k loops have been interchanged. However, this interchange could result in some paths being missed out and so the algorithm now requires two passes before it completes. The modification in the range of the second loop index is an optimization that reduces the cost of two passes. In each pass the computation is essentially:

```
For every node i
For every successor k of i within some range
For every successor j of k
Make j a successor of i.
```

The problem with these methods is that they cannot be applied to efficiently compute the transitive closure of database relations unless the whole database and the result of the computation of the transitive closure can fit in the main memory of the computer. Unfortunately, most of the real life databases are too big for that.

SUMMARY OF THE INVENTION

In accordance with our invention, transitive closure of a database can be achieved efficiently even when the database is stored on a secondary storage, such as magnetic disk or optical disk or magnetic tape or slower core memory, by minimizing accesses to the secondary storage. The method consists of partitioning the database, maintained in the preferred embodiment as a set of nodes where attached to each node is a list of nodes that are directly connected to it, transferring one partition at a time from the secondary storage to the main memory, and processing a partition in such a way that accesses to the portions of the database not in main memory are minimized. The partitions of the database need not be determined a priori. As much of the unprocessed database as would fit a predetermined fraction of main memory is fetched as one partition, and if, during the processing of this partition, the main memory becomes full, the size of the partition is reduced dynamically by discarding a portion of the database in the current partition, and including this portion in the next partition. The processing of a partition involves, for each node in the partition, the operation of creating a direct connection between every pair of nodes that are indirectly connected through this node.

BRIEF DESCRIPTION OF THE DRAWING

FIG. 1 depicts an illustrative database;

FIG. 4 presents the database corresponding to the FIG. 3 graph;

DETAILED DESCRIPTION

FIG. 1 depicts a simple database relation which is used herein to describe our method and apparatus for efficiently creating the transitive closure of a database relation. The FIG. 1 database has five fields, with the first and the third field being both defined over the domain of valid part numbers, the second and the fourth fields being both defined over the domain of possible part names, and the fifth field being defined over the domain of positive integers. The relation basically states that the part specified by its number in the first field and name in the second field is used in the manufacture of the part specified in the third and fourth fields, and the number of units of the former required to produce one unit of the latter are given in the fifth field.

As indicated previously, a compound field in a database consists of two or more fields considered together. In the FIG. 1 example, the first and second fields can be combined to create a single compound field giving the number and name of a machine part. Similarly, the third and fourth fields may be combined.

Figure 2:
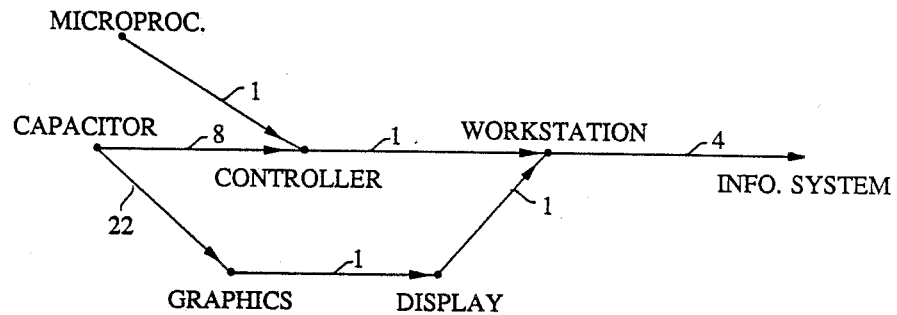
FIG. 2 shows the graph representation of the FIG. 1 database.
Figure 3:
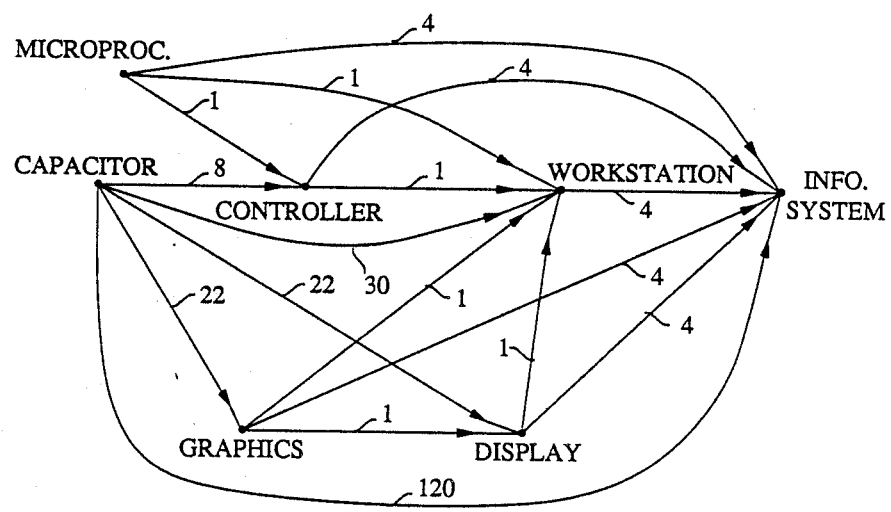
FIG. 3 shows the transitive closure of the FIG. 2 graph.

FIG. 2 shows a directed graph corresponding to the FIG. 1 database, and FIG. 3 shows the transitive closure of the FIG. 2 graph. FIG. 4 shows the database relation corresponding to FIG. 3. In FIGS. 3 and 4, the function used to compose the new labels for the links is a "multiply-and-add" over the links that give rise to this new link. This function is chosen in this example because it preserves the original meaning of the database relation: that is, the label corresponding to the fifth field correctly gives the number of units of a certain part that are required, directly or indirectly, in the manufacture of a certain other part.

Usually, a database relation is too big for it to be stored entirely in the main memory of a general purpose computer, and must of necessity be stored on a secondary storage medium such as a magnetic (or optical) disk. Only a fraction of the relation can be read into and retained in the main memory at any one time. Compounding the problem, the transitive closure of a database relation is always larger, and usually considerably larger, than the original relation. Therefore, it is even less likely that the transitive closure of a database relation will fit in the main memory of a computer. Because of the nature of the secondary storage that is typically used in today's computers, and the interaction with the computer's control and fast resident memory, there is considerable time taken in the transfer of data between a secondary storage medium and the primary resident storage medium. Our objective is to offer apparatus that efficiently computes the transitive closure of a database relation by reducing extent of transfers between resident memory and secondary memory. That is, the objective of our apparatus is to efficiently transform a conventional database to a "transitive closure complete" database.

Figure 5:
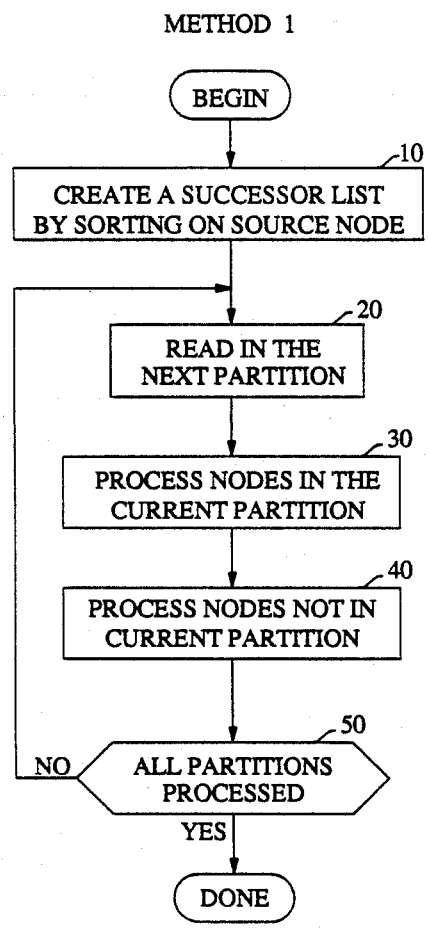
FIG. 5 presents a flowchart of one method in accordance with the principles of our invention.

In accordance with our objective, the conventional database is stored in a secondary storage medium and the transitive closure apparatus accesses the data on that medium, performs the transformation, and stores the resulting "transitive closure complete" database in the same medium as shown in FIG. 5. Processor 200 accesses database 100, performs the transformation and places the results back in database 100.

The key to our approach is reducing the number of accesses to the secondary memory, and to achieve that, our method for computing the transitive closure involves partitioning the database into convenient segments that fit within the memory of processor 200 and considering every node in the graph in an efficient manner. In connection with such consideration, our method either (a) construct a link and corresponding label between every node that has an incoming link to the node under consideration and every node that has an outgoing link from the node under consideration, if such a link does not already exist, or (b) updates the label of such a link, if it already exists.

More specifically, since each tuple is a link with two nodes, our method considers either the destination node or the source node as the pivot node under consideration. By creating a link between the node(s) having links arriving at each pivot node and the node(s) having links exiting each pivot node we construct the entire transitive closure.

The known procedures require repeated accesses to the entire database, but we wish to relieve that requirement to the extent possible. In accordance with our invention, therefore, transitive closure is achieved by:
(a) sorting the initial database 100, primarily on the source node and secondarily on the destination node;
(b) transferring a partition of the sorted database to processor 200 (where a partition comprises the entries of a selected number of pivot nodes) and processing the information within the partition;
(c) passing each of the remaining links in database 100 through processor 200 to consider their effects vis-a-vis the pivot nodes of the transferred partition, and construct transitive links, as necessary;
(d) returning the partition to database 100;
(e) transferring the next partition from database 100 to processor 200 and repeating the process.

Sorting database 100 is not difficult even when the database is large. Conventional techniques can be applied, such as hashing into buckets that fit in the primary memory of processor 200, followed by an in-memory sort of each bucket. When the pivot node is the source node, after such a sort, all links emanating from a node will be grouped together. In fact, since our objective in performing the sort is to group together all tuples that emanate from a node, alternate techniques may also be used that achieve the same results.

As for step (c) above where accesses to database 100 are still required, the procedure is to select one entry from the partition and one entry either from the partition or from the database itself (by accessing database 100). One of the selected entries is considered the head of the pair and the other is considered the tail of the pair. A determination is made as to whether the destination node of the head entry is the same as the source node of the tail entry. If it is, then we construct a tuple from the source node of the head entry to the destination node of the tail entry. When we construct an entry, we account for all fields, as described below, including an accounting for other links between the two nodes should they exist. Still, an injudicious procedure for such examination of nodes could lead to a very large number of accesses to database 100. In accordance with our invention, however, a single consideration of each node pair will suffice.

Assurance that a single consideration of each such pair of nodes would result in a complete transitive closure of the graph comes from observing the two following constraints.

constraint 1: For every source node, the destination nodes must be considered in the same order in choosing the links to which step (c) is applied.

constraint 2: Before step (c) is applied to a link ij (source node i, destination node j), it must have already been applied to link jk for every node k that appears prior to j in the sorted order.

We discovered that any order which satisfies the above two constraints can be used; and to illustrate, the following presents three different methods of application of step (c) to the pairs of nodes in the graphs.

Method 1—FIG. 5

Step 1 (block 10) Create a successor list by interacting database 100 with processor 200. Specifically, for each node, i, in database 100, create a list that identifies the destination nodes for which node i is a source node. When the field on which the database is first sorted is the source node field, this step is not necessary because the sorting process results in all links with a common source node being stored sequentially in the database.

Step 2 (block 20) Transfer to processor 200 the highest partition (in the sorted list) which has not been processed. The size of the transferred partition is dependent on the size of the primary memory in processor 200 and on the number of links that share a common source node. Since processor 200 constructs new links and some will populate the current partition, we generally populate only about 50% of the available memory. This figure can be selected at any other level, as desired, keeping in mind two conflicting goals. On the one hand, one should not pick a very large initial occupancy level because if too many links are constructed, substantial computing overhead will be required to provide the necessary storage for the constructed links. On the other hand, one should not pick too small an initial occupancy level because large partitions reduce the number of iterations and, consequently, increase the processing speed.

Step 3 (block 30) For each node j within the partition, consider in order all links in the partition that have this node j as the destination node. For each such link, construct a link from the source node of the link under consideration to each of the destination nodes of links where node j is the source node.

Step 4 (block 40) Read the successor list of every node in database 100 that is not in the current partition, in turn. For each such node, k, determine whether it is a source node of a link that is destined to node i, where node i is a source node in the current partition. If it is, then construct a link between node, k, and every node j that is a successor of node i. As an aside, when a link is constructed it is also stored in the database. In order to maintain the sorting, the storing of constructed links must be in the form of an insertion, which can be accomplished in a conventional manner; for example, by using a technique known as insertion sorting. Rather than storing each entry as it is created, one may postpone storage until a batch of entries have been constructed, or the processing of the partition is complete.

Step 5 (block 50) Repeat steps 3 and 4 for each of the partitions.

Figure 6:
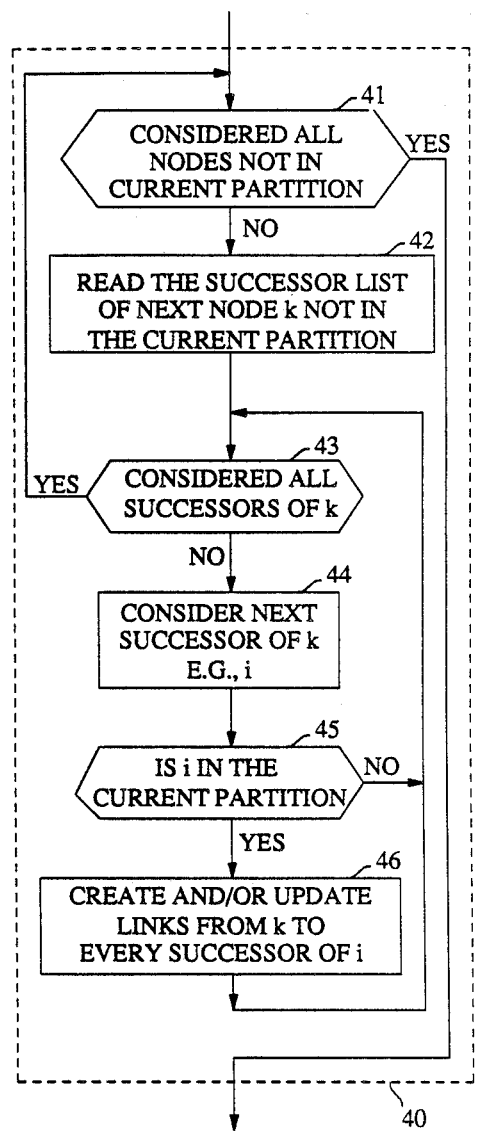
FIG. 6 presents a more detailed flowchart of block 40 in FIG. 5.

FIG. 6 describes step 4 with greater specificity. In accordance with FIG. 6, as long as the process is not finished, in the sense that all nodes in database 100 have been considered, block 41 permits the process to continue by passing control to block 42. Block 42 reads the successor list from database 100 of a node k that is not in the partition currently residing in processor 200. Blocks 43 and 44 combine to consider all of the successor nodes of node k. Block 45 determines whether the considered successor of node k is, in fact, a node in the current partition, say node i; and if it is, block 46 constructs and/or updates the necessary links from node k to the successors of node i. Control returns to block 43 after each successor of node k is considered; and when all such successors of k have been considered, block 43 returns control to block 41.

Figure 7:
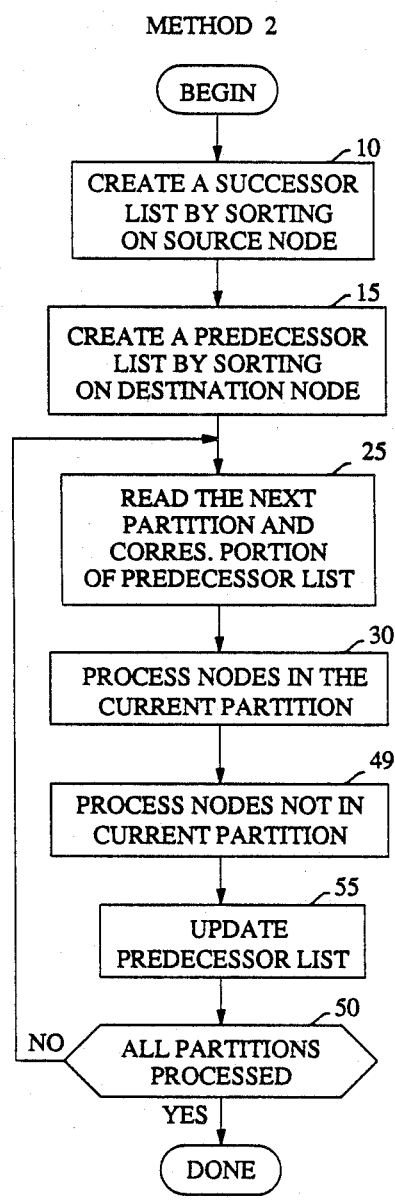
FIG. 7 presents a flowchart of a second method in accordance with the principles of our invention.

Method 2—FIG. 7

In processing the data in accordance with Method 1, the successor list of each node is read into processor 200 (Step 4), and only then can one determine whether links must be constructed. In accordance with our Method 2, in addition to the successor list that naturally results from the sorting process, a predecessor list is constructed and maintained (in database 100 or in processor 200 if space permits) that identifies the predecessors of each node (keeping only the source node and destination node information). The predecessor list can be constructed by sorting database 100 on the destination node. The predecessor list obviates the need to access the successor list of nodes that would result in no links being constructed and thereby further reduces the number of accesses to database 100.

It should be noted that both the predecessor list and the successor list must be maintained as new links are constructed. With respect to the successor list, when a succesor list to a node in the current partition is read into processor 200, as directed by an entry in the predecessor list, the insertion sorting into the successor list associated with the constructed link can be accomplished immediately because the successor list is in processor 200. The predecessor list, on the other hand, cannot be updated immediately, because a new predecessor list must be read into the memory of processor 200. In general, we update the predecessor list at the end of step 4. Creating the predecessor list and updating the list are depicted in FIG. 7 by blocks 15 and 55. Although block 49 in FIG. 7 is labeled identically to block 40 in FIG. 5, in FIG. 7 the procedure of block 49 is slightly different from that of block 40, as shown in FIG. 8.

Figure 8:
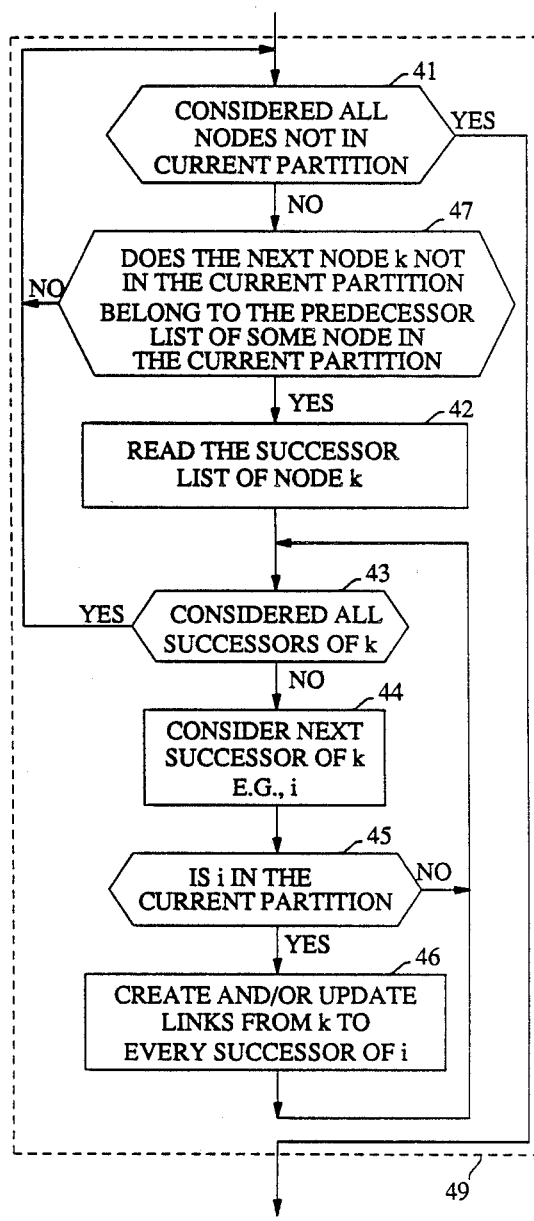
FIG. 8 presents a more detailed flowchart of block 49 in FIG. 7.

In FIG. 8, following block 41 is decision block 47 which utilizes the predecessor list. Control passes to block 42 only if node k belongs to the predecessor list of some node in the current partition.

Figure 9:
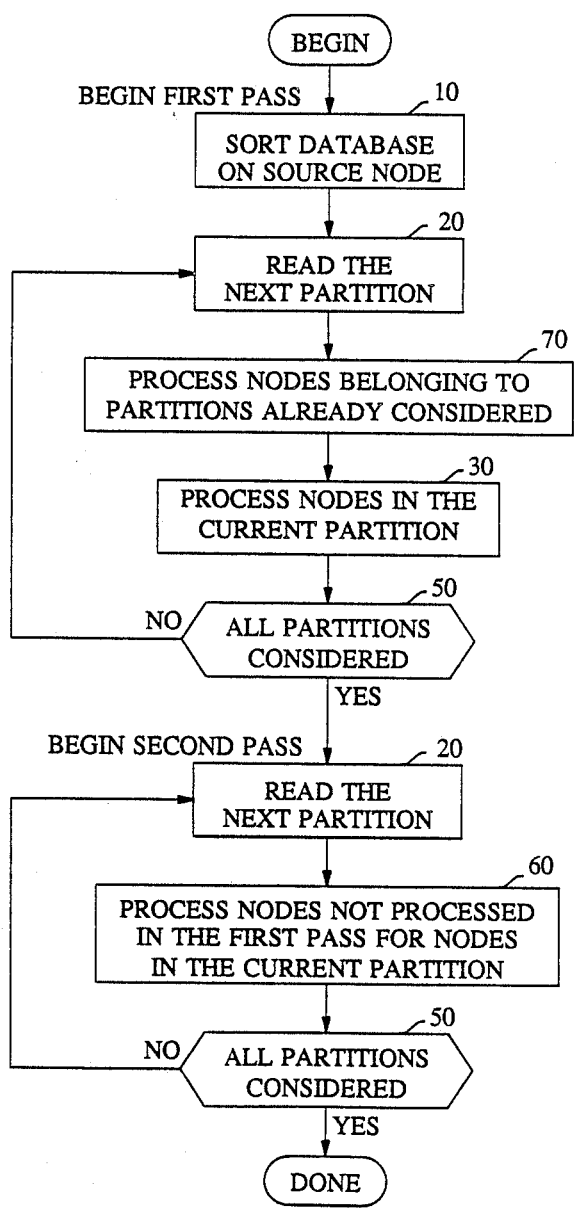
FIG. 9 presents a flowchart of a third method in accordance with the principles of our invention.

Method 3—FIG. 9

Our Methods 1 and 2 consider the source node as the pivot node, and the question for each link in the partition is whether other links exist in the database having a destination node that is also the source node under consideration. In our Method 3, we consider the destination node as the pivot node and we search the database for links having a source node that is also the destination node under consideration.

In accordance with this Method 3, Steps 3 through 5 of Method 1 are replaced with the following steps.

Figure 10:
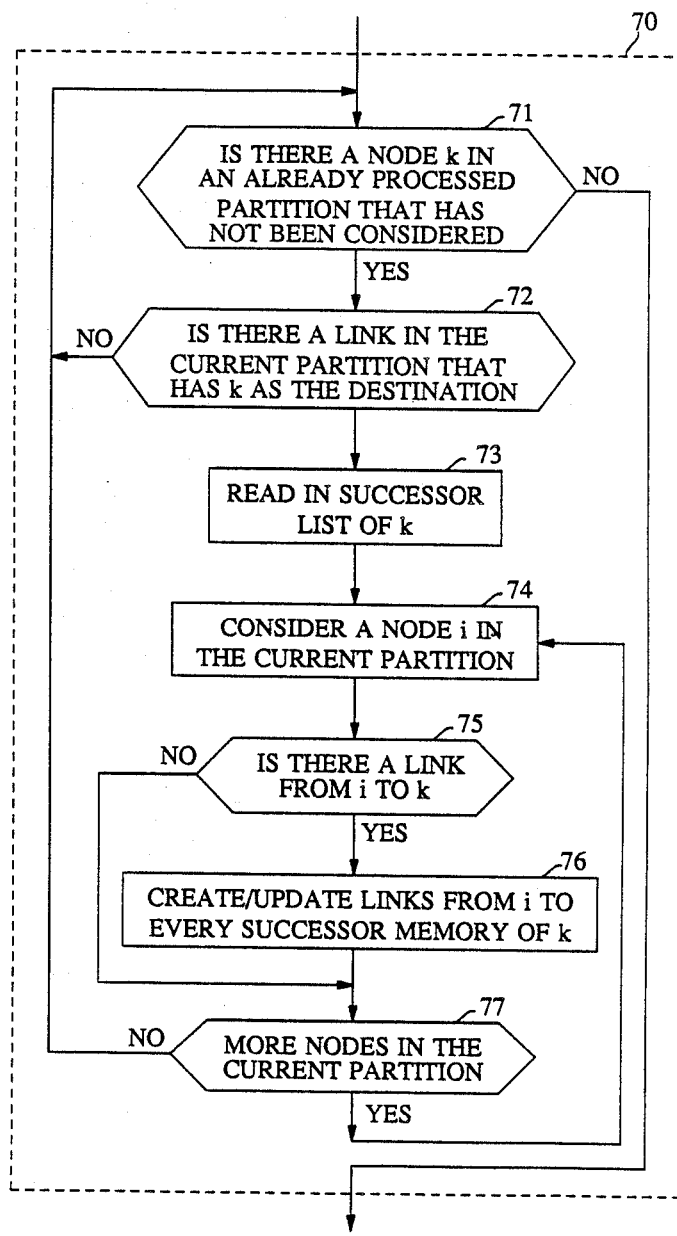
FIG. 10 presents a more detailed flowchart of block 70 in FIG. 7.

Step 3 (block 70 and FIG. 10) For each node j that belongs to a previously processed partition, if there is a link in the current partition from some node i to node j, read in the successor list of node j and construct all links between node i and the destination nodes in the successor list of node j. This step can be enhanced when considering a destination node of one entry in the partition, by observing that other entries in the partition may have the same destination node.

Step 4 (block 30) If node j belongs to the current partition, then construct a link from the source node of the link under consideration to each of the destination nodes of links where node j is the source node.

Step 5 (block 20-60-50) After all partitions have been processed once, repeat the process, but this time consider all j nodes that have not been eligible for consideration in the first pass (comprising Steps 3 and 4). It may be noted that the second-pass partitions, in general, will be different from the first-pass partitions, since the sizes of the successor lists would have changed.

It may also be noted that whereas in Methods 1 and 2 a 50% memory occupancy by a partition appears reasonable in many applications, in Method 3 a lower figure is probably more appropriate because in this method it is only the partition that is resident in the processor 200 that grows.

In all three of the above methods, the basic point to note is that the given database is partitioned, and the processing is done with as few references to tuples not in the current partition. In the course of the processing, new links are discovered, and it is to be expected that the size of the current partition will grow. In some cases as indicated earlier, it may be that the partition grows too big to fit in memory. In that case, one can simply delete the last successor list in the current partition and include it in the next partition.

While such a filling up of main processor 200 memory does not result in any catastrophe in our methods, it does means that the successor lists that had to be deleted from the main memory were wastefully read in with the current partition. To minimize such wasteful reads, the size of a new partition being read in should be such as to fill up only a fraction of the memory and allow for growth.

Consider the database of FIG. 1. Applying Method 1 to construct the transitive closure, suppose that only the first two tuples constitute the first partition. No modifications would result on account of step 3. Each of the remaining tuples would be read to determine that there are no tuple not in the current partition that have "Capacitor" as their destination, and no modification would result on account of step 4. Then the next partition is read in, consisting, say, of the next three tuples. There is a link from "Microprocessor" to "Controller" and a link from "Controller" to "Workstation", both in the current partition, therefore a new link is created from "Microprocessor" to "Workstation". Now both "Microprocessor" and "Controller" have links to "Workstation" which has a link to "Info. Syst.", all these links in the current partition, so as part of step 3, links are created from both these nodes to the "Info. Syst." node. Proceeding to step 4, we find a link from "Capacitor" to "Controller", and create new links from "Capacitor" to each of "Controller"'s successors. Continuing in this fashion, one obtains the transitive-closure complete database as shown in FIG. 4.

Method 2 works in essentially the same fashion. The major difference to note is illustrated by the fact that when the first partition is in primary memory, none of the tuples in other partitions need be read in to the primary memory, because one can immediately determine from the predecessor list of "Capacitor" that no tuples exist with "Capacitor" as the destination node.

Method 3 works the same way as Method 1 for the first partition. When the second partition is in memory, the only links in previously processed partitions have "Capacitor" as source node, while "Capacitor" is not the destination node of any link in the current partition; therefore step 3 does not result in any modification to the database. Step 4 is the same as the Step 3 of Method 1. The third and last partition consists of the last two tuples in the database of FIG. 1. Applying Step 3, we discover that there is a tuple with source node "Workstation" that has already been processed; the destination of this tuple, "Info. Syst.", is the destination of a new tuple with the source being "Display", the source node of the tuple in the current partition with "Workstation" as the destination node. Applying Step 4, the successors of "Display" are also made successors of "Graphics". This completes the first pass.

In the second pass, the first partition is read into the main memory again, and this time, all the successors of "Controller" and of "Graphics" are made successors of "Capacitor". No changes need be made to the second and third partitions. The transitive closure complete database of FIG. 4 has been obtained.

Treatment of Labels

As stated earlier, each tuple in a database comprises a number of fields. The above discussion is centered primarily on the two simple or compound fields that make up the source node and the destination node in the graph representing the database. In addition to the source node and the destination there are other fields in each tuple, and they can be segregated into three groups: those fields that are uniquely associated with the source node, those fields that are uniquely associated with the destination node, and those fields that characterize the relationship between the source node and the destination node. For example, in a database specifying two cities in fields 1 and 2, respectively, the size of the airport in each of the cities in fields 3 and 4, respectively, and the distance between the cities in field 5, the categories to which the fields belong are quite obvious.

The question arises in connection with the tuples that are constructed in the course of transitive closure as to the treatment of fields other than the source node and the destination node.

In accordance with our invention, when a new tuple is constructed, the fields associated with the node that constructed the source node in the new tuple are replicated in the fields associated with the source node. Similarly with respect to fields associated with the destination node. The fields that characterize the relationship between the source and the destination could be derived in many different ways. In general, that field can be described as some specified function of the tuples corresponding to the links that participated in creating this new link. If multiple paths (i.e., a path being a series of connected links) are found between the same source and destination nodes, one may wish to construct multiple links between the same source-destination pair, with appropriate values for these relationship fields, or one may construct only one link and obtain the value of the relationship fields as some function of the values of the fields derived for each of the paths independently. For example, in the cities example mentioned above, the distance field for every path might most logically be computed as the sum of the distance fields in each of the component links. Sometimes one may wish to keep all of the possible paths and distances in the result relation. More often, however, one would keep a single tuple for each pair of cities using the smallest function to choose the value of the distance field among the values of the field on each of the possible paths.

Database Compression

It is readily realized from the foregoing that the transitive-closure complete database is larger, and often much larger, than the original database. In spite of it being larger, however, it does not contain all of the information that is known about the relation. For example, a link is constructed between two nodes to indicate that a path exists in the original database between the two nodes; but the transitive-closure complete database does not specify that path or paths. On the other hand, quite often one is interested only in whether such a path exists and, in fact, quite often one is not even interested in the label (e.g. cost) associated with the path. In all cases, however, there are benefits to be derived from compressing the resulting database as much as possible, given the needs of the system to which the transitive closure is applied.

In applications where the primary need is to know that a path exists between two nodes, our compression technique yields a database that is sometimes even smaller than the original database. This technique can be viewed as comprising three steps. The first step is to separate the graph representing the database into a few chains as possible, where a chain is a path from some source node to some other destination node. In achieving this end, it is permissible for a node to belong to more than one chain. The second step is to number the nodes that lie on a chain, in order of their appearance in the chain. The third and final compression step is to associate with each source node only by the lowest numbered destination nodes in all chains that are reached by that source node.

Compression is accomplished because only a fraction of the links associated with the source node need be stored.

Once the compressed storage structure has been created, it is possible to determine whether a given node A has a link to another given node B in the transitive-closure complete graph by checking whether node A has a link to some node C that appears prior to node B on some chain, as determined by their position numbers.

For example, using the graph of FIG. 2 (or the graph of FIG. 3), one can create two chains such that each node in the graph lies on at least one. The two chains could be "Microprocessor-Controller-Workstation-Info.Syst", as chain one, and "Capacitor-Graphics-Display", as chain two. Now consider the "Capacitor" node. Of five out-going links from it in FIG. 3, only one need be explicitly stored: the link to the "Controller" node. Now, if queried whether capacitors are used in the manufacture of displays, that is whether there is a link from the "Capacitor" node to the "Display" node in FIG. 3, we are able to respond affirmatively, since the "Display" appears after the "Capacitor" node in chain two. Similarly, if queried whether capacitors are used in the manufacture of workstations, we can respond positively, since there is a link from the "Capacitor" node to the "Controller" node, which appears prior to the "Workstation" node in chain one. However, if asked whether capacitors are used in the manufacture of microprocessors, we are able to respond negatively, because there is no link from the "Capacitor" node to the "Microprocessor" or to any node that appears prior to it in some chain.

Notice that in the example above, while we were able to successfully determine whether or not there was a link from some node to some other node, we were not able to say what the label on such a link would be. In other words, we were able to confirm that capacitors are indeed required in the manufacture of workstations, but were unable to determine how many go into making each workstation.

In applications where not only the reachability information is important but also the path and the label, we employ a different compression technique. In accordance with this technique, we associate with each source node a table. Each entry in the table consists of three fields: (i) destination node, (ii) the node that is to be used as the first hop on the path from the source node to this destination node, and (iii) the label of this path. If there are multiple paths between a source node and a destination node, but all these paths go through the same first hop, there will be only one entry in the table. On the other hand, if there are multiple paths between a source node and a destination node and each of these paths goes through a different first hop, there will be as many entries as the number of paths in the table.

The structure just described is then compressed further (in accord with the above-described three step method) by storing in the table associated with a source node only those entires of destination nodes that lie earliest on a chain. Thus, if two destinations lie on the same chain, and one is earlier than the other, only the entry for the first node is present in the table.

System Applications

Our transitive closure method and apparatus can be employed in a myriad applications, such as the transportation industry, telecommunication industry, construction industry, manufacturing control, or expert systems.

In the airline industry, for example, one may maintain a basic database of the direct flights between various cities. The transitive closure operator can then be applied to develop path information between any two cities in the database which may or may not have a direct connecting flight between them. In a telecommunication network, one may have a database that gives the reliability and capacity of direct trunks between points. The transitive closure operator can then be applied to determine the most reliable link between two switching centers and the total capacity between the switching centers. In a construction project, one may have a database of activities, and the transitive closure operation may be employed to determine the critical path (in a manner of a PERT chart). In the scheduling of parts for the manufacture of a complex system, such as a car, for example, transitive closure can be employed to develop a list of the materials and the information needed to assemble the proper components and to attach a proper cost to the manufactured product. In connection with an expert system implementation, we note that expert systems often employ inheritance hierarchies to express relationships between entities. For example, one entry in an expert system database may state that a patent attorney is a human being, and another entry in the expert database may state that human beings breathe. The transitive closure operator can then be applied to deduce that a patent attorney breathes.

Figure 11:
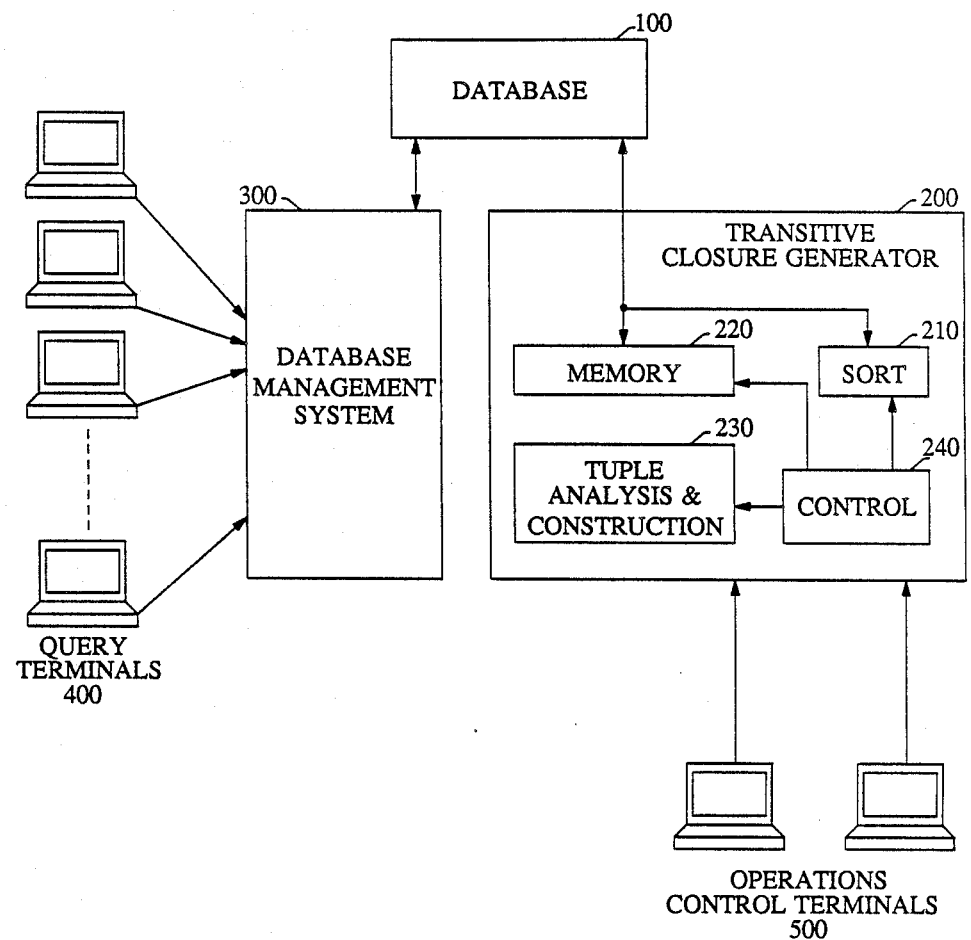
FIG. 11 depicts one system implementation for employing the transitive closure generator in accordance with our invention.

FIG. 11 depicts the structure of a system employing the principles of our invention. Although FIG. 11 is directed to a dispersed data access system, such as the reservation system of an airline, it is reasonable to expect that our system has use in a number of other applications. In FIG. 11 there is a plurality of query terminals 400 which are connected to a database mangement system 300. In an airline reservation system, terminals 400 are the access points for the reservation clerks at the airline counter or at the travel agent. The queries posed by terminals 400 require, reasonably often, information that demands a transitive closure on two of the fields in the database. Database manager 300 communicates with database 100, and database 100 communicates with transitive closure generator 200. Also connected to generator 200 are terminals 500. Terminals 500 emanate from the operations control centers of the airline, and they provide information that affects the fundamental information in database 100. This information may be basic changes in the flights from city to city, changes concerning canceled flights due to weather and the like, or even more transitory information such as overbookings on certain flights, etc. In other words, terminals 500 have the power to cause transitive closure generator 300 to initiate a processor of converting the basic database information in database 100 into a transitive closure complete database.

Database management system 300 can be any database manager that satisfies the requirements of the user. There are a myriad of such managers that are known in the art, so this disclosure does not delve into the intricacies of database management. As for generator 200, it should be appreciated from the above descriptions of flowcharts 5-10 that the functions required of generator 200 can be effectively accomplished with a conventional digital computer. In the FIG. 11 system, it is anticipated that a transitive closure of the Official Airline Guide (North American Edition) would take substantially less than one hour on a conventional digital computer. Should higher processing speed be desired, generator 200 can easily be realized with special purpose hardware, as outlined in FIG. 11.

In connection with the special hardware for realizing generator 200, block 210 communicates with database 100 and its sole function is to sort the data. The sorting can be accomplished in block in a conventional manner with the use of two registers, a comparator, some memory and control circuitry. Also included in generator 200 is memory 220 where each processed partition is stored, and tuple analysis and creation apparatus 230 that is responsive to the data stored in memory 220 and to control signals of block 240. The tuple analysis portion of apparatus 230 is, most advantageously, a stored program controlled device, e.g., a microprocessor, whereas the tuple construction portion of apparatus 230 may be a combinatorial circuit.

The above description and of the three methods embodying the principles of our invention and the apparatus for doing same are, of course, merely illustrative; aiming to teach the principles of our invention and to enable a skilled artisan to make and use the invention. Of course, there are many variations that may be applied without departing from the spirit and scope of our invention, such as reversing the "source node" and "destination node" senses.

We claim:

1. In a system comprising a secondary memory and a controller with a primary memory, a method carried out in said controller for developing and storing in said second memory at least a portion of the transitive closure of a database stored in said secondary memory, where said database contains a plurality of entries and each entry contains a plurality of fields, whith each of said fields being assigned to a preselected attribute of said database, and the signal value in each of said fields specifies the value associated with the corresponding attribute for that entry, and where said transitive closure is developed with respect to a selected field or fields of said database designated as a source node and a selected field or fields of said database designated as a destination node comprising:

a step of developing an ordering of said nodes in said database;

a step of developing a partition of said database and retrieving said partition from said secondary memory and placing it in said primary memory, where said partition contains all entries of said database that share a chosen set of source nodes;

a step of an entry by selecting one entry in said partition and one entry in either said partition or said database, where one entry is a head entry and one entry is a tail entry, and developing an entry for said transitive closure of said database with a source node being the source node of said head entry and a destination node being the destination node of said tail entry, when the destination node of said head entry is the same as the source node of said tail entry; and a step of returning to said step of developing and retrieving a partition until the entire database has been partitioned.

2. The method of claim 1 where at least one of said partitions comprises a chosen set of more than one source node.

3. The method of claim 1 where said step of selecting is applied only to select head entries with a source node i and a destination node j that satisfy the conditions: (a) that all entries with a source node i and a destination node k, where k is less than j in said ordering, have been previously selected as a head entry, and (b) that all entries with a source node j and a destination node k, where k is less than j in said ordering, have been previously selected as a head entry.

4. The method of claim 1 wherein said step of developing entries is followed by a step of storing developed entries in said secondary memory in order.

5. The method of claim 1 wherein the size of said chosen set of source nodes in each partition is selected to occupy not more than a preset portion of the memory size of said primary memory.

6. The method of claim 1, further including a step responsive to said step of developing an entry, for changing the size of said chosen set of source nodes in accordance with the number of entries created.

7. The method of claim 1 further comprising a step of updating labels when said step of developing an entry results in two paths in said database between a source node and a destination node.

8. The method of claim 1 wherein said step of developing an entry comprises:
 a step of processing nodes within said partition followed by a step of processing nodes not in said partition.

9. The method of claim 8 wherein said step of processing nodes within said partition comprises:
 a step A of selecting a head entry in said partition with a source node i and a destination node j such that the product-sum $i+jK$ is the lowest achieved product-sum from among all entries in said partition not previously selected, where K is a preselected constant;
 a step B of selecting a tail in said partition having a source node equal to the destination node of the head entry selected by said step A;
 a step C of constructing a new entry having a source node equal to the source node of the head entry and a destination node equal to the destination node of the tail entry;
 a step D of repeating steps B and C when another tail entry is found in said partition having a source node equal to the destination node of the head entry selected by said step A; and
 a step E of repeating steps A through D when another head entry is found in said partition.

10. The method of claim 8 wherein said step of processing nodes not in said partition comprises:
 a step A of selecting a source node not in said partition;
 a step B of selecting a head entry having the selected source node and the earliest destination node in said ordering, not previously considered, that is also present as a source node in said partition;
 a step C of constructing a new entry having a source node equal to the source node of the head entry and a destination node equal to the destination node of the tail entry;
 a step D of repeating step C when another tail entry is found in said partition having a source node equal to the destination node of the head entry selected by said step B; and
 a step E of repeating steps B through D when another head entry is found in said step B;
 a step F of repeating steps A through E until all source nodes not in said partition have been utilized.

11. The method of claim 1, further comprising a step of maintaining a successor list for each node, specifying all entries for which said node is a source node, said successor list being employed in carrying out said step of selecting one entry in said partition and one entry in either said partition or said database.

12. The method of claim 1, further comprising:
 a step of maintaining a successor list for each node, specifying all entries for which said node is source node, and
 a step of maintaining a predecessor list for each node, specifying all entries for which said node is a destination node,
 said successor list and predecessor list being employed in carrying out said step of selecting one entry in said partition and one entry in either said partition or said database.

13. The method of claim 1 wherein said step of developing an entry comprises modifying a label of an existing entry with a source node being the source node of said head entry and a destination node being the destination node of said tail entry.

14. The method of claim 1 further comprising a step of updating a label of an entry having one source node and another destination node when another entry having the same source node and the same destination node exists.

15. In a system comprising a secondary storage and a controller with a primary storage, a method for developing at least a portion of the transitive closure of a database stored in said secondary storage, said database containing entries with signal values attributed to preassigned fields of said database, and said transitive closure being developed with respect to a selected field or a set of fields of said database, designated as a source node, and a selected field or a set of fields of said database, designated as a destination node, comprising:
 a step of developing an ordering of said nodes in said database;
 a step of developing partitions of said database, where each partition contains all entries of said database that share a chosen set of source nodes;
 a first pass of steps for developing entries for said database by considering all of said partitions, one at a time; and in considering each partition, first developing entries for each destination node in said partition which associate the source nodes of entries in said partition having said destination node to destination nodes of entries in previously considered partitions having a source node that is the same node as said destination node, and next developing entries for each destination node in said partition which associate the source nodes of entries in said partition having said destination node to destination nodes of entries in said partition having a source node that is the same node as said destination node;
 a second pass of steps for developing entries of said database by considering all of said partitions, one at a time; and in considering each partition, creating new entries for each destination node in said partition not considered in said first pass of steps.

16. The method of claim 15 further comprising a step of updating labels when said step of developing results in two paths in said database between a source node and a destination node.

17. The method of claim 15 wherein said step of developing entries comprises modifying a label of an existing entry with a source node being the source node of said head entry and a destination node being the destination node of said tail entry.

18. The method of claim 15 further comprising a step of updating a label of an entry having one source node and another destination node when another entry having the same source node and the same destination node exists.

19. A method for developing a compressed store of a database containing entries with signal values attributed to preassigned fields of the database, said database being at least in part transitive-closure complete with respect to a selected field or a set of fields, designated as a source node, and a field or a set of fields designated, as a destination node, comprising:

a step of creating a set of chains, each chain comprising an ordered set of said database entries where the destination node of every entry in said chain, other than the last entry, is the same as the source node of to the next entry in said chain, with said set of chains being selected so that each node, whether a destination node or a source node, appears at least once in said set of chains as a source node or a destination node of some entry in some chain; and for each source node in said database, from the set of entries in said database sharing said source node, a step of deleting entries in said set for which the destination node appears later in some chain than the destination node of some other entry in said set, developing thereby said compressed store.

20. The method of claim 19 further including a step, interposed between said step of creating and said step of deleting, for assigning an identifier for each node, to identify the chain of said node and the position of said node within the chain.

21. A system for developing an augmented database from an original database residing in storage, where said original database contains a plurality of entries and each entry contains a plurality of fields, with each of said fields being assigned to a preselected attribute of said database, and the signal value in each of said fields specifies the value associated with the corresponding attribute for that entry, and where said augmented database is realized through a sequence of transitory databases, the first transitory database being the original database and each subsequent transitory database being realized by a modification of the previous transitory database and where said augmented database is at least a part of a transitive closure of said original database, said transitive closure being with respect to a selected field or fields of said database designated as a source node and a selected field or fields of said database designated as a destination node, said system including a controller having an associated memory, with said controller characterized by:

means for sorting said transitory database within said storage;

means for forming partitions in said transitory database, where each partition contains entries of the database being partitioned that share a common source node;

means for retrieving a partition of said transitory database from said storage and placing it in said memory;

means for developing entries for said augmented database in response to consideration of pairs of entries of said augmented database, with one member of said pair being an entry in said memory and the other member of said pair being an entry of said transitory database in said memory or in said storage, the developed entries being the modifications to said transitory database; and means for placing in said storage entries developed by said means for developing entries to form the next transitory database;

where said means for retrieving retrieves each partition at most two times, and said means for developing develops said entries when the destination node of one member of a considered pair is also the source node of the other member of said pair.

22. An information-providing system comprising:

storage means for maintaining a database of information;

terminals for requesting information contained in said database;

an enhanced database manager responsive to said terminals and to said storage means, for developing at least a portion of a transitive closure of said database, and for querying said database to retrieve said information requested by said terminals;

means for modifying the information stored in said database; and means for initiating a development of said portion of a transitive closure of said database when the information stored in said database is modified wherein said enhanced database manager includes a controller and memory, and develops said portion of a transitive closure of said database by partitioning said database and loading each partition from said database and into said memory at most two times.

* * * * *